Dec. 2, 1941.   H. W. N. HAWK   2,264,380
ART OF EXAMINING QUARTZ
Filed July 30, 1940

Inventor
Henry W. N. Hawk
By
Attorney

Patented Dec. 2, 1941

2,264,380

UNITED STATES PATENT OFFICE 2,264,380

ART OF EXAMINING QUARTZ

Henry W. N. Hawk, Merchantville, N. J., assignor to Radio Corporation of America, a corporation of Delaware Application July 30, 1940, Serial No. 348,603

5 Claims. (Cl. 88—14)

My present invention relates to the art of examining quartz of the type possessing piezoelectric properties and has for its principal object to provide an extremely simple and accurate method of simultaneously locating all three X-axes in imperfect quartz specimens, such, for example, as so-called "river-bed" quartz.

Another and important object of my invention is to provide a method of locating the X-axes in a quartz specimen and one which in its practice likewise discloses the electrical sense of polarity of the said axes and also the virtual location of the major and minor side and apex faces of the specimen.

Figure 1:
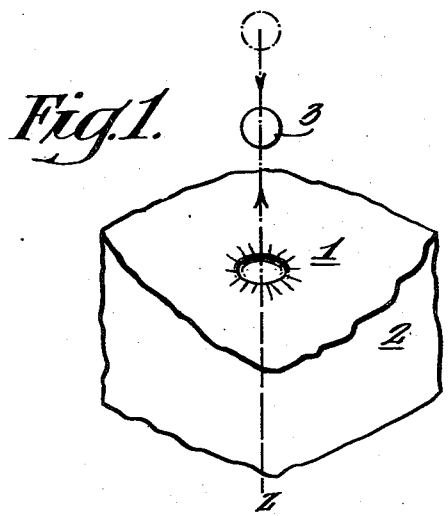
Figure 3:
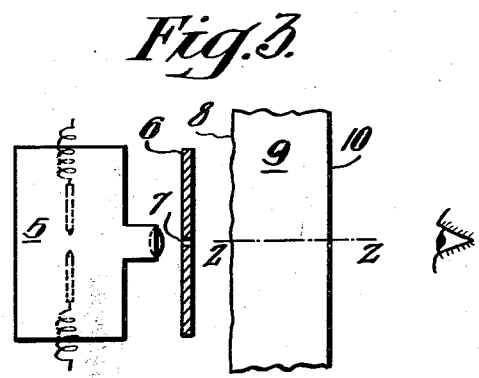
Figure 2:
Figure 4:
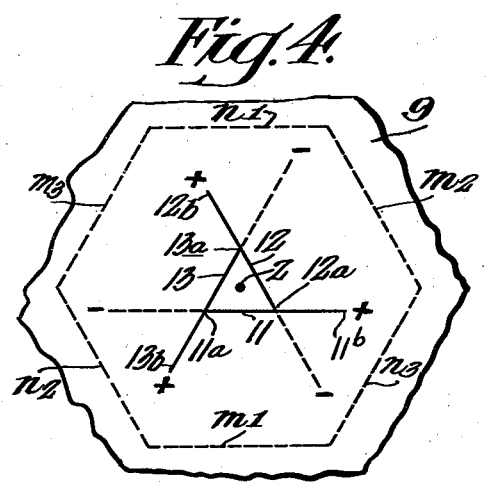
Figure 5:
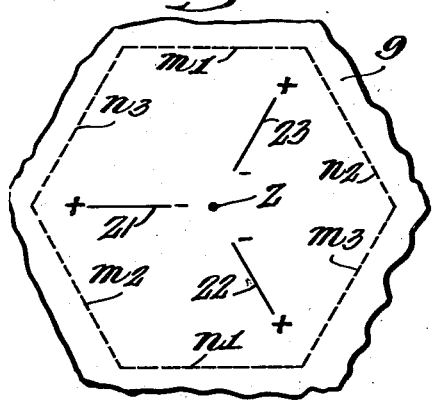
Figure 6:
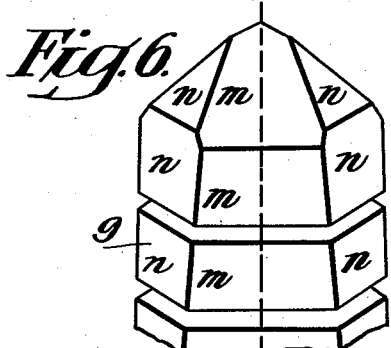

My invention will be described in connection with the accompanying drawing, wherein Figure 1 is a partly pictorial view in perspective showing the first of two steps of a simple method of locating the X-axes in a piece of quartz, Figure 2 is a magnified top plan view of the piece of quartz shown in Fig. 1 and which will be referred to in explaining the second step of the said method, Figure 3 is a side partly diagrammatic elevational view of an apparatus which may be employed in carrying out the improved method of my invention, Figures 4 and 5 are plan views of quartz slabs whose major faces lie in planes normal to the optic (Z) axis and wherein the said faces have been inspected and marked with certain reference lines and characters as an aid in explaining the principle of my invention, and Figure 6 is a view in perspective on a smaller scale of a quartz mother crystal.

Referring now to Fig. 1, I have observed that, if one forms a circular or spherical dent 1 upon the surface of a quartz slab 2 whose top and bottom surfaces are perpendicular to the optic (Z) axis of the mother crystal, as by dropping a steel ball 3 thereon, and then polishes or grinds down the surface of the quartz adjacent the dent or point of impact, the dent 1 will assume a triangular pattern as shown at 1a in Fig. 2. The sides of this triangle 1a coincide substantially exactly with the three X-axes, X1, X2, X3, of the mother crystal.

The above-described method of simultaneously locating the three X-axes in a quartz specimen, though an extremely simple one, is subject to several disadvantages, to wit: (a) the specimen may be shattered or seriously marred in forming a dent in its surface, (b) unless the dent spans a substantial surface area of the specimen, the sides of the resulting triangular pattern may have to be extended (as indicated by the dotted lines, Fig. 2) by means of a ruler to give a readily discernable indication of the location of the X-axes, (c) this method does not reveal the polarity of the indicated X-axes.

I have now discovered that the pattern formed by a spot of light projected upon an etched surface of a quartz slab whose top and bottom surfaces lie in planes which are substantially normal to the optic (Z) axis not only reveals (a) all three X-axes of the specimen and (b) their polarity, but also (c) the virtual location of the major and minor side and apex faces of the mother crystal from which the specimen was obtained.

As above indicated, in carrying the invention into effect, it is first necessary to determine the location of the optical or Z-axis in the mother crystal or other specimen. This may be done by any known method. By way of example, the mother crystal, if it is translucent or, alternatively, a translucent piece cut from any part of the mother crystal, may be immersed in cedar oil (or other substance having an index of refraction of the same general order as quartz) and examined by means of polarized light while rotating the specimen until the colored light patterns or rings which are characteristic of the Z-axis are observed. The Z-axis at that time lies along the line of sight of the observer. The location of the Z-axis having been determined, a slab of any desired thickness is cut from the specimen in such a manner that the major faces of the slab lie in substantially parallel planes which are substantially normal to the Z-axis. Such a slab is designated 9 in Figs. 3, 4 and 5. It is then necessary to etch one of the principal surfaces of the slab as with a 48% solution of hydrofluoric acid for a period of, say, three or four hours. The best results are achieved when the opposite principal surface of the slab is polished, or, at least, not etched.

Any convenient spot source of light may be employed in inspecting the slab. In Fig. 3, there is shown, by way of example, an arc light 5 provided with a mask 6 containing a pin hole 7 through which the light is projected upon the etched face 8 of the slab 9. The operator preferably observes the slab 9 from its unetched or polished side 10. Obviously, however, the pattern may be projected on a screen (not shown), if desired.

The pattern produced in or on the quartz slab by the spot source of light, as viewed by an observer (indicated by the eye in Fig. 3) looking in the direction of the source, through the unetched or polished surface of the slab, will, if the spot is small enough, be similar to that indicated by the solid lines 11, 12 and 13 in Fig. 4.

The solid line pattern of Fig. 4 comprises an equilateral triangle wherein one end of each line forming the sides of the triangle terminates at the junction with the line forming another side and the other end of each line extends beyond its junction with the line forming the remaining side. Thus, the solid line 11 terminates at one end at the junction 11a with the line 13 and its other end 11b extends beyond its junction 12a with the line forming the remaining side 12.

In accordance with my observations, the lines 11, 12 and 13 (Fig. 4) which are simultaneously revealed in the slab comprise or coincide with the three X-axes of the quartz. I have also observed that the projected or extended ends (i. e., the terminals marked 11b, 12b, 13b) of these lines are the electrically positive ends of the X-axes with which they coincide. Hence, I may mark or otherwise designate each of these ends with a positive symbol (+) and the opposite ends with a negative symbol (−) for the attention of the lapidary. Further, I have observed that a major side surface of the mother crystal always lies parallel to, and to the right, of each of said lines 11, 12 and 13 when said lines are sighted from a point adjacent their nonextended or negative terminals 11a, 12a, 13a.

Since, as shown in Fig. 6, all unbroken quartz mother crystals are hexagonal pyramids, I am thus able to reconstruct or visualize the original appearance of the mother crystal from which the slab 9 was cut. To this end, I may draw lines $m^1$, $m^2$ and $m^3$ on the slab parallel to the lines 11, 12 and 13, respectively, and connect them by the lines $n^1$, $n^2$ and $n^3$. In this case, the lines $n$ will be understood to be parallel to the minor side faces of the mother crystal.

(As will be appreciated by those skilled in the art, the ability to locate the virtual location of the major and minor side and apex faces of the quartz specimen is of especial importance to the lapidary in the cutting of resonator and oscillator elements whose electrode faces must be tilted with respect to either a major or minor face.)

The light pattern shown by the solid lines of Fig. 4 will ordinarily be obtained only when the light projected upon the etched side of the specimen is brought to a very fine focus. Such a focus could be obtained by means of a suitable condensing lens system, but may be achieved more economically by means of a mask 6 (as shown in Fig. 3) in which case the aperture 7 should be clean-cut and preferably about the diameter of an ordinary straight pin. An increase in the size of the spot may change the form of the pattern.

By way of example, referring to Fig. 5, a pattern comprising three radially extending lines 21, 22 and 23, each 120° apart will be obtained when a slightly larger spot of light impinges the central or Z-axis of the slab. If the light is directed to a point on the slab away from its center, these lines will ordinarily not appear to meet if drawn to a common point (as they do in Fig. 5), but will extend outwardly toward the edges of the slab, as if from a triangle (see Fig. 4) whose sides are formed by extending the said lines inwardly toward each other. In either event, and as described in connection with Fig. 4, these lines comprise or coincide with the X-axes of the quartz, the positive terminals of these X-axes are in the (outward) direction of extension of the said axes, and a line drawn parallel to and to the right of each of these axes as viewed by an observer looking along the axes in the direction of said positive terminals comprises the virtual major (M) faces of the quartz.

I claim:

1. Method of locating the X-axes, the positive terminals of said X-axes, and the virtual location of the major faces of an irregular quartz slab having its principal surfaces lying in substantially parallel planes normal to the Z-axis, said method comprising etching one of said surfaces, directing a spot of light upon said etched surface to produce a pattern of light comprising three lines being substantially 120° apart adjacent the opposite surface of said slab, observing the direction of extension of each of said lines from the point at which each line intersects another of said lines marking the said three lines and the terminals thereof on said slab as X-axes whose positive terminals are in the direction of extension of said lines, drawing on the slab a line parallel to and to the right of each of the said X-axes as viewed by an observer at the negative terminals thereof looking in the direction of said positive terminals, and marking the three lines thus drawn as the virtual major faces of the quartz.

2. Method of locating the X-axes of a quartz slab having its principal surfaces lying in substantially parallel planes normal to the Z-axis, said method comprising etching one of said surfaces, directing a spot of light upon said etched surface to produce a pattern of light comprising three lines visible from the opposite surface of said slab, and marking on the slab the said lines as the X-axes.

3. Method of determining the location and polarity of a quartz slab having its principal surfaces lying in substantially parallel planes normal to the Z-axis, said method comprising etching one of said surfaces, directing a spot of light upon said etched surface to produce a pattern of light comprising three lines lying substantially 120° apart and visible from the opposite surface of said slab, observing the direction of extension of each of said lines from the point at which each line intersects another of said lines, and marking said lines and the terminals thereof on said slab as X-axes whose positive terminals are in the direction of extension of said lines.

4. Method of simultaneously locating the three X-axes of a quartz slab having its principal surfaces lying in substantially parallel planes normal to the Z-axis, said method comprising etching one of said surfaces, directing a "pin-point" of light upon said etched surface to produce a substantially triangular light pattern visible to an observer looking into the slab from the opposite surface thereof, and marking on the slab the lines comprising the sides of said triangular light pattern as the three X-axes.

5. Method of simultaneously locating the three X-axes of a quartz slab having its principal surfaces lying in substantially parallel planes normal to the Z-axis, said method comprising etching one of said surfaces, directing upon said etched surface a spot of light of a diameter such as to produce in said quartz a light pattern comprising three substantially radially extending lines, and marking on the slab the said radially extending lines as the three X-axes.

HENRY W. N. HAWK.